No. 886,725. PATENTED MAY 5, 1908.
E. M. ORTON.
HAY GATHERER AND STACKER.
APPLICATION FILED FEB. 12, 1906.
3 SHEETS—SHEET 2.
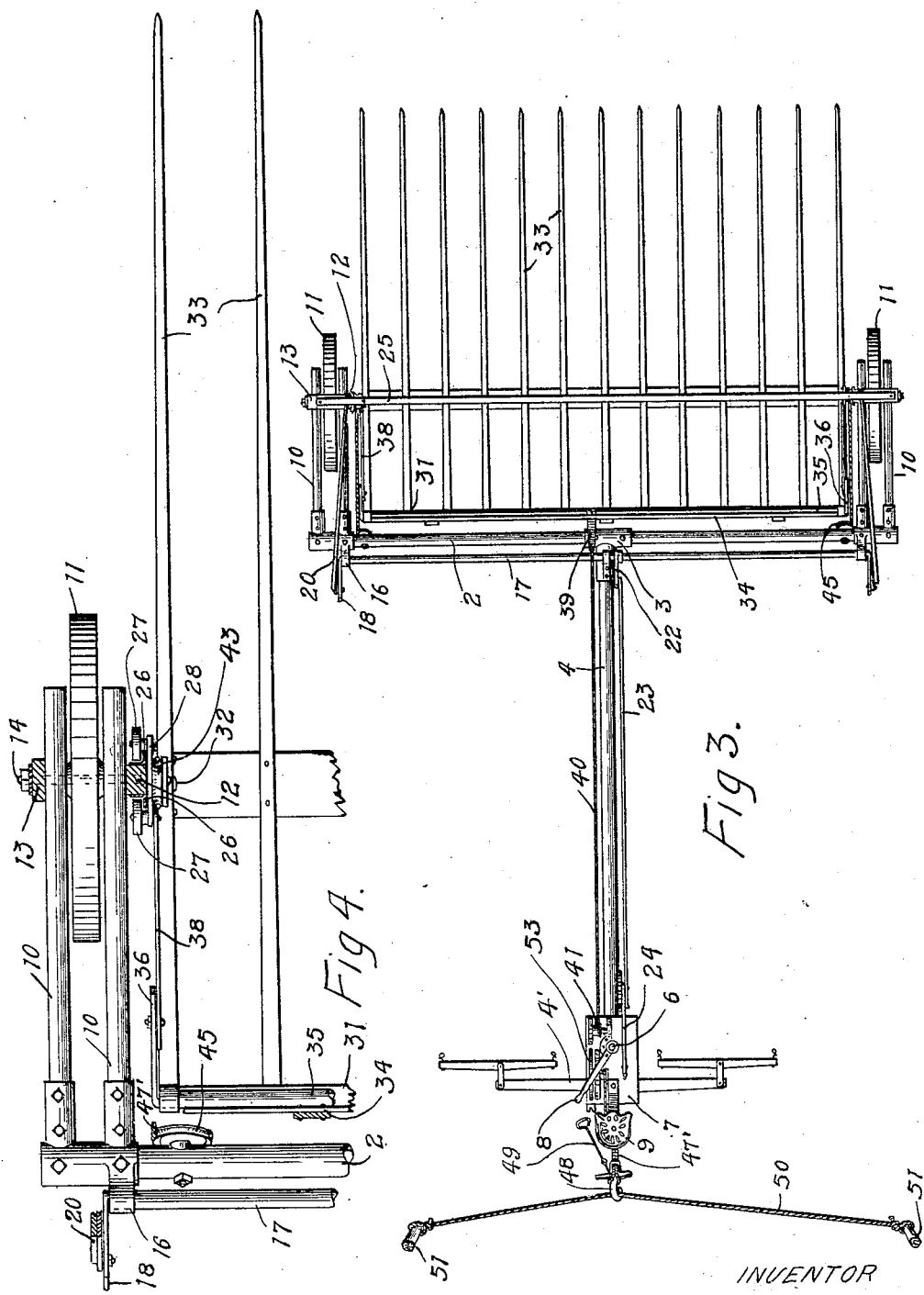
WITNESSES
INVENTOR
EDWARD M. ORTON.
BY
HIS ATTORNEYS.

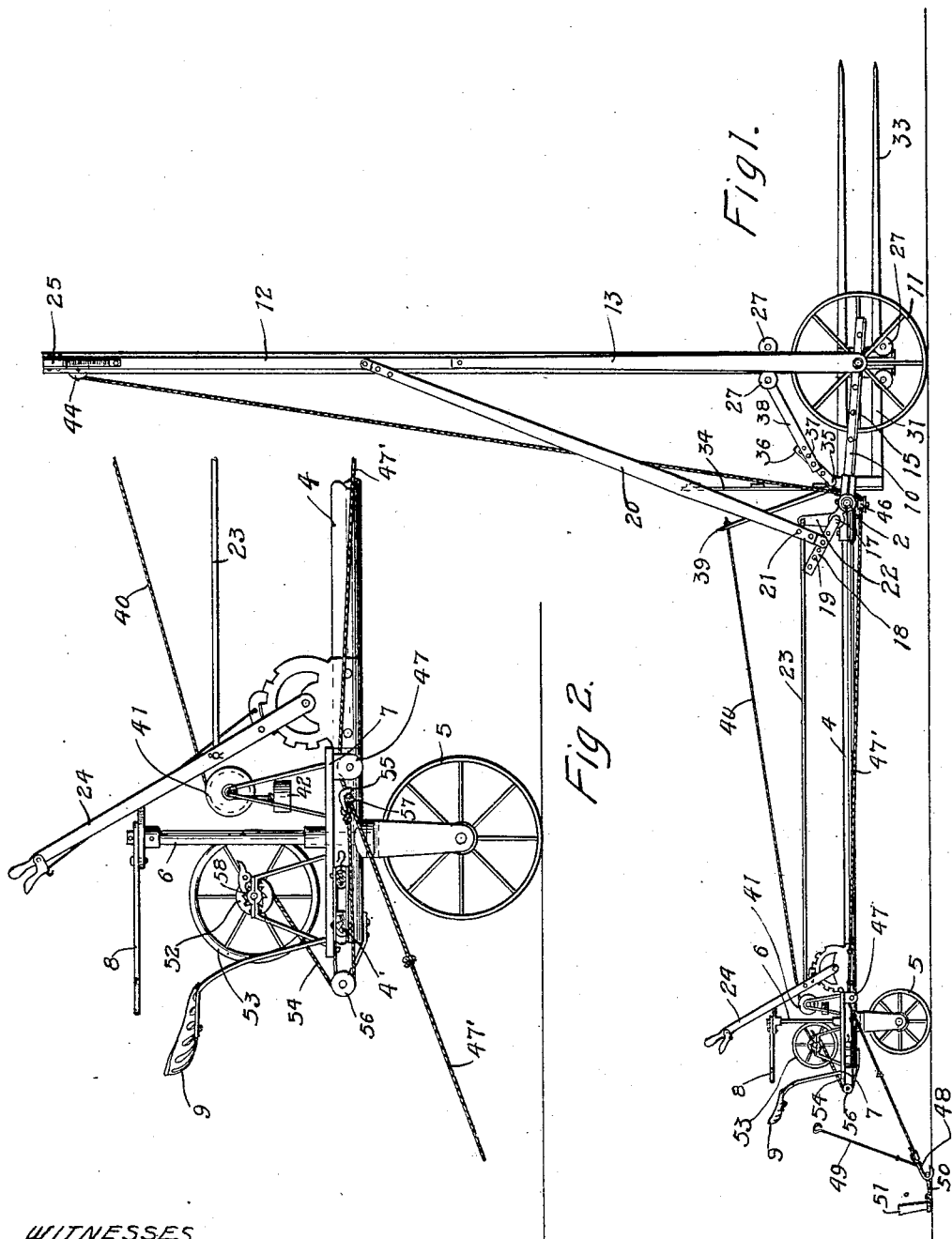

No. 886,725. PATENTED MAY 5, 1908.
E. M. ORTON.
HAY GATHERER AND STACKER.
APPLICATION FILED FEB. 12, 1906.
3 SHEETS—SHEET 3.
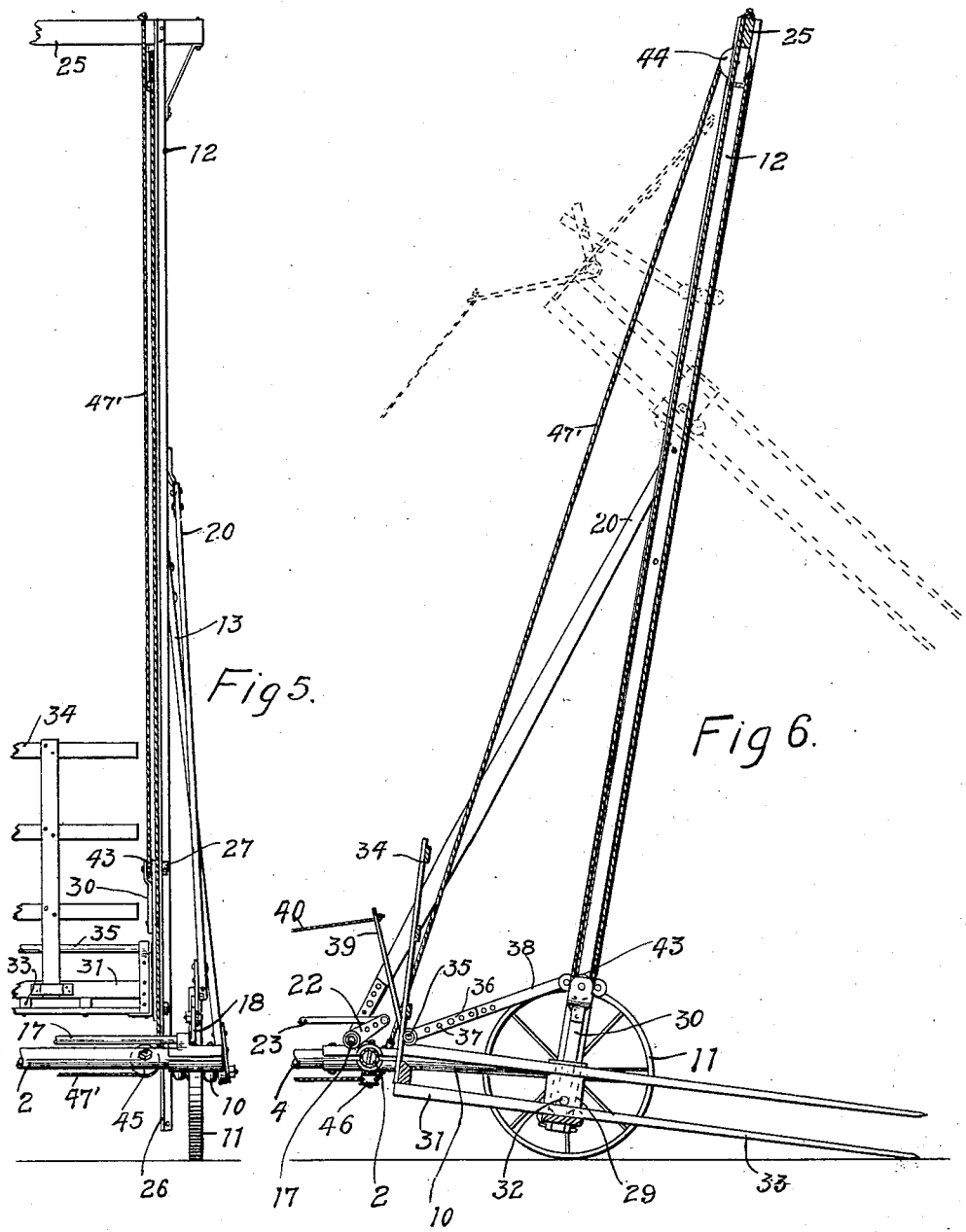
WITNESSES.
INVENTOR
EDWARD M. ORTON.
BY
HIS ATTORNEYS.

UNITED STATES PATENT OFFICE.

EDWARD M. ORTON, OF MINNEAPOLIS, MINNESOTA.

HAY GATHERER AND STACKER.

No. 886,725.   Specification of Letters Patent.   Patented May 5, 1908.

Application filed February 12, 1906. Serial No. 300,757.

*To all whom it may concern:*

Be it known that I, EDWARD M. ORTON, of Minneapolis, Hennepin county, Minnesota, have invented certain new and useful Improvements in Hay Gatherers and Stackers, of which the following is a specification.

The object of my invention is to simplify and improve the construction of the machine shown and described in Letters Patent of the United States No. 786,513, issued to me April 4, 1905.

A further object is to provide a machine for gathering and stacking hay, wherein the load will be centrally supported on the carrying wheels, thereby greatly facilitating the handling of the loaded fork or gatherer.

A further object is to provide means for raising the loaded fork preparatory to moving the same to the stack.

A further object is to dispense with all springs usually used in machines of this kind.

Other objects of the invention will appear from the following detailed description.

The invention consists, generally, in various constructions and combinations, all as hereinafter described and particularly pointed out in the claims.

In the accompanying drawings forming part of this specification, Figure 1 is a side elevation of a hay gatherer and stacker embodying my invention. Fig. 2 is a side elevation of the rear portion of the machine. Fig. 3 is a plan view of the machine. Fig. 4 is a detail view partially in section of one side of the machine showing the manner of mounting the tilting gatherer or fork thereon. Fig. 5 is a rear view of one end of the machine, and Fig. 6 is a vertical sectional view of the forward portion of the machine showing the gathering fork tilted to its working position, the raised or dumping position of the fork being indicated by dotted lines.

In the drawing, 2 represents an axle, preferably of tubing, extending transversely of the machine and connected at its central portion by a suitable coupling 3 with the forward end of a draft pole 4 having the usual draft connection 4'. A steering wheel 5 is provided beneath the rear end of the draft pole, and has a vertical steering post 6 projecting above a platform 7 and operated by means of a lever 8 in substantially the same manner as described in my patent above referred to. A seat 9 is mounted on the platform near the steering lever and the other operating mechanism to be hereinafter described.

At each end of the axle 2 I provide a pair of forwardly extending arms 10 composed preferably of tubing, each arm of a pair being suitably spaced from the other arm of the same pair and having the carrying wheels 11 of the machine journaled between their forward ends, all substantially as described in my former patent.

12 represents upright standards having forked lower ends which straddle the carrying wheels, and are pivoted on the axes of said wheels and adapted to swing forwardly to allow the fork to gather up the hay and to overhang the stack and facilitate the discharge of the load thereon.

As indicated in the drawing, I prefer to mount the lower end of each standard on the inner end of the wheel axis and extend a brace 13 from the middle portion of the standard to the outer end of the wheel axis. This construction may, however, be modified if preferred. Any suitable axis may be provided for each carrying wheel, but I prefer to employ a bolt 14 passing through the lower ends of the standards and braces and the horizontal arms 10 and the wheel hubs. A pivotal support is thus provided for the upright standards and one which also serves as a journal for the wheels. The arms 10 are preferably provided with a series of holes 15 to permit the adjustment of the upright standards and braces forward or back of the axes of the wheels. Ordinarily, however, I prefer to mount them on the same pivots, as indicated in the drawings. The upright standards being centrally supported over the wheels will cause the load when the fork is raised to be evenly distributed thereon and supported directly upon the wheel axles or pivots, thus preventing undue tilting of the machine forward or backward, and facilitating its movement across the field when loaded.

To tilt the upright standards, I provide brackets 16 mounted on the axle 2 and having a rock shaft 17 journaled therein. The ends of said shaft are provided with arms 18 having a series of holes 19 in which the lower ends of bars 20, also having holes 21, are adjustably secured. The upper ends of the bars are attached to the upper portions of the upright standards. An arm 22 is mounted on the rock shaft 17 and connected by a rod 23 with an operating lever 24 mounted on the draft pole near the steering mechanism above described. By means of this lever, which has the usual locking latch device, the operator can rock the shaft 17 and swing the upright standards forward or backward as desired, the adjustable connections of the bars 20 with the said standards permitting the degree of movement to be regulated at will. The upper ends of the standards are connected by a suitable cross bar 25, and their vertical edges are provided with angle bars 26 which form guideways for antifriction wheels 27 mounted in pairs on traveler plates 28, which are adapted to slide vertically on the inner faces of said standards while the wheels 27 roll on the angle bar guideways. Below the traveler plates 28 is a second pair of similar plates 29, also having guide wheels adapted to travel on the bars 26, and connected with the plates 28 by straps 30. There are, therefore, on each side of the machine a pair of plates slidable on the upright standards and connected to move simultaneously. A fork or gatherer 31 has a pivotal support 32 in the lower plates 29 on each side of the machine, said fork having the usual teeth or tines 33 and being mounted so that substantially an equal portion of its weight is in front and in the rear of its pivots to facilitate the tilting of the same and to more evenly distribute the load on the carrying wheels. An upright rack 34 is provided at the rear end of the fork to hold the hay in place thereon, and a rock shaft 35 is mounted on the said fork and has a toggle joint connection at each end with the upper traveler plates 28, said connections consisting preferably of arms 36 provided on the ends of the rock shaft 35, and having perforations 37 and adjustably connected with perforated links 38 pivoted on the plates 28. These links and arms are adapted to be swung into line with one another on a dead center, as indicated in Fig. 6, for the purpose of locking the fork and preventing it from tilting in either direction. Whenever desired the rock shaft 35 may be oscillated to break the toggle joint connection and swing the arms 36 out of line with the links 38, as indicated in Fig. 1, and lower the points of the fork teeth to a working position. The adjustable connections between the rock shaft and the vertical moving plates 28 allow the operator to regulate the degree of tilt of the fork according to the character of the ground where the machine is being used.

To operate the rock shaft 35 I provide an arm 39 thereon having a flexible connection 40 which extends back to the steering platform and is attached to a drum 41 on the shaft on which a weight 42 is suspended for the purpose of taking up the slack in the cable 40. Whenever desired, the operator will grasp the cable and oscillate the shaft 35 and move the connections between said shaft and the plates 28 to the position shown in Fig. 1, thereby raising the forward end of the fork.

For the purpose of raising the fork to its dumping position on the standards, I mount sheave wheels 43 between the plates 28 and the straps 30 on each side of the machine. At the top of the upright standards I arrange wheels 44, and similar wheels 45 beneath the lower ends of the standards on each side of the machine, and intermediate wheels 46 near the forward end of the draft pole. Wheels 47 are also mounted beneath the steering platform on each side of the draft pole. A cable or rope 47' is provided at its middle portion with a grappling hook 48, and the ends of the said cable are carried around or over the said wheels described and secured to the top of the upright standards. When, therefore, power is applied to the cable the fork will be raised on the standards. The grappling hook will normally be carried by the machine and upon approaching a stack, or wherever it is desired to discharge the load of the fork, the operator will throw off the hook and allow it to dig into the ground or engage some obstruction while the machine will be moved on toward the stack, and at the proper time the cable will become taut and will elevate the fork sufficiently to allow its load to be deposited on the stack in the manner described in my former application.

For convenience I prefer to provide a suitable handle 49, by means of which the operator, without leaving his seat, can cast off the grappling hook to dig into the ground or engage a rope 50 stretched between pegs 51. It is sometimes desirable, particularly on rough ground, to raise the loaded fork slightly preparatory to the trip across the field to the stack. I therefore mount a drum 52 on the steering platform operated by a hand wheel 53 and having a cable 54 provided at one end with a hook 55 and passing over a pulley 56. A knot 57 is provided in the cable 47', and when the hook 55 is in engagement therewith the operator may revolve the drum 52 and raise the fork a sufficient distance to clear the ground, a suitable ratchet mechanism 58 being provided in connection with the drum 52 to prevent backward movement. The hook 55 will not interfere with the normal operation of raising the fork to the top of the standards, as the cable will slip readily therethrough.

In operation, the machine is moved across the field lengthwise of the windrows and the hay gathered up on the fork until the desired load is obtained, when if some distance from the stack the fork will be raised slightly and the machine drawn to a point near the stack, where the fork is raised to the top of the standards and the load discharged. My improved means for mounting the fork and standards on the frame will insure an equal distribution of the load, and prevent sagging or tilting when the machine is loaded.

I claim as my invention:

1. The combination, with a frame having carrying wheels, of standards having forked lower ends to straddle said wheels whereby the load will be centered thereon, and a gathering fork carried by said standards.

2. The combination with a frame having carrying wheels, of upright standards having forked lower ends to straddle said wheels and pivotally supported on said frame, a gathering fork supported between said wheels and standards, said fork being vertically movable on said standards, and means for tilting said standards and operating said fork, substantially as described.

3. The combination, with a frame having carrying wheels, of upright standards pivoted on said frame, the lower ends of said standards being adjustable forwardly or rearwardly with respect to said carrying wheels and a vertically movable gathering fork carried by said standards.

4. The combination, with a frame having carrying wheels, of upright standards supported thereon, and a pivotally supported gathering fork, a rock shaft mounted on said fork and having forward extensions, links having a sliding connection with said standards at one end and attached to said extensions at the other end and adapted to be alined with said extensions to depress the forward end of said fork or swung out of alinement with said extensions to tilt said fork and means for oscillating said rock shaft.

5. The combination with a frame having carrying wheels, of upright standards supported thereon, traveler plates having anti-friction bearing wheels on said standards, a gathering fork pivotally supported by said traveler plates between said standards, a rock shaft mounted on said fork and having forwardly turned ends, links adjustably connecting said forwardly turned ends with said traveler plates and adapted to be alined with said ends to depress the rearward end of said fork or swung out of alinement with said ends to tilt said fork, and means for oscillating said shaft.

6. The combination with a frame having carrying wheels, of upright standards pivotally supported at their lower ends on said frame, a rock shaft mounted on said frame and having backwardly turned ends, bars adjustably connecting said ends with the upper portion of said standards, means for rocking said shaft, and a gathering fork supported between said standards and vertically movable thereon, substantially as described.

7. The combination with a frame having carrying wheels and a rearwardly extending push pole, of upright standards mounted on the forward portion of said frame, a gathering fork suspended between said standards and vertically movable thereon, a rope provided with a grappling hook and arranged to pass over pulleys mounted on said frame and on said standards and attached to said fork for raising the same when said grappling hook engages a suitable stop near the point of discharging the load, and means for placing said rope under tension and raising said fork a predetermined distance from the ground preparatory to moving the load across the field, substantially as described.

8. The combination with a frame having carrying wheels, of standards having lower ends to straddle said wheels and pivotally supported on said frame, the pivots of said standards being coincident with the axes of said wheels, a gathering fork suspended between said wheels and standards, said fork being suitably balanced on its pivots and having a vertical movement between said standards, and means for raising said fork and tilting the same, substantially as described.

9. The combination with a frame having carrying wheels, of upright standards mounted thereon, a gathering fork pivotally supported between said standards and wheels, travelers vertically slidable on said standards and whereon said fork is pivoted, a rock shaft mounted on said fork, means adjustably connecting said rock shaft with said travelers and whereby the tilting movement of said fork is controlled, and means for rocking said shaft, substantially as described.

10. The combination, with a frame having carrying wheels, of upright standards mounted thereon, a gathering fork pivotally supported between said standards and vertically movable thereon, a rock shaft having forward extensions and links having a sliding attachment with said standards at one end and adjustably connected at the other end to said extensions, and means for oscillating said shaft.

11. The combination, with a frame having carrying wheels, of upright standards pivotally supported on said frame, a rock shaft having backwardly turned extensions, bars adjustably connecting said extensions with said standards and whereby the tilt or inclination of said standards may be regulated, means for rocking said shaft and a gathering fork supported between said standards and vertically movable thereon.

12. The combination, with a frame having carrying wheels of upright standards pivoted on said frame and having their pivots coincident with the axes of said wheels and the lower ends of said standards being adjustable horizontally toward the front or rear of the machine, and a vertically movable gathering fork carried by said standards.

13. The combination, with a frame having an axle and carrying wheels and forwardly extending arms 10 having a series of holes 15, of upright standards having pivots to enter said holes 15 and whereby said standards are adjustable on said arms, and a vertically movable gathering fork.

14. The combination, with a frame having carrying wheels, of upright standards mounted thereon, a gathering fork vertically movable between said standards, a rock shaft, means adjustably connecting said rock shaft with said standards and means for oscillating said shaft.

15. The combination, with a frame having carrying wheels, of upright standards mounted thereon and having forked lower ends to straddle said wheels, a vertically movable gathering fork carried by said standards, a rock shaft and means adjustably connecting said rock shaft and said standards.

16. The combination, with a frame having carrying wheels, and a rearwardly extending draft pole, of upright standards mounted on said frame over said carrying wheels, whereby the load will be centered thereon, and a gathering fork suspended between said standards.

In witness whereof, I have hereunto set my hand this 5th day of February 1906.

EDWARD M. ORTON.

Witnesses:
    RICHARD PAUL,
    C. MACNAMARA.